United States Patent [19]

Studenberg

[11] Patent Number: 5,086,435
[45] Date of Patent: Feb. 4, 1992

[54] METHOD AND APPARATUS FOR DETECTING SIGNALS ON DIGITAL DATA SYSTEMS

[75] Inventor: Fred J. Studenberg, West Melbourne, Fla.

[73] Assignee: Rockwell International Corporation, El Segundo, Calif.

[21] Appl. No.: 422,713

[22] Filed: Oct. 17, 1989

Related U.S. Application Data

[63] Continuation-in-part of Ser. No. 258,923, Oct. 17, 1988, Pat. No. 4,952,070.

[51] Int. Cl.$^5$ .............................................. H04L 7/02
[52] U.S. Cl. ...................................... 375/20; 375/106; 375/110
[58] Field of Search ....................... 375/81–82, 375/20, 104, 36, 110, 106; 329/361; 360/51; 307/354, 356, 358; 328/164; 330/259; 333/109, 119

[56] References Cited

U.S. PATENT DOCUMENTS

| | | | |
|---|---|---|---|
| 4,071,692 | 1/1978 | Weir et al. | 375/17 |
| 4,131,761 | 12/1978 | Giusto | 375/20 |
| 4,257,126 | 3/1981 | Theall, Jr. | 375/76 X |
| 4,387,460 | 6/1983 | Boutmy et al. | 370/110.4 |
| 4,408,189 | 10/1983 | Betts et al. | 375/20 |
| 4,408,325 | 10/1983 | Grover | 375/20 |
| 4,414,663 | 11/1983 | Panzer | 370/110.4 |
| 4,434,485 | 2/1984 | Huffman et al. | 370/55 |
| 4,606,050 | 8/1986 | Sekigawa et al. | 375/82 X |
| 4,628,493 | 12/1986 | Nelson et al. | 370/100 |
| 4,631,721 | 12/1986 | Ono et al. | 370/100 |
| 4,852,124 | 7/1989 | Raucci | 375/20 |

Primary Examiner—Benedict V. Safourek
Assistant Examiner—Tesfaldet Bocure
Attorney, Agent, or Firm—Gregory G. Williams; M. Lee Murrah; H. Frederick Hamann

[57] ABSTRACT

A digital data system which includes a passive coupler from a transmission line and a clock recovery device and a sample pulse generator coupled with the clock recovery device to generate sample pulses in relation to the recovered clock signal and a comparator device for comparing the sample pulse signal with the signal received from the passive coupler.

5 Claims, 2 Drawing Sheets

CLOCK + 0000 MESSAGE

CLOCK + 1010 MESSAGE

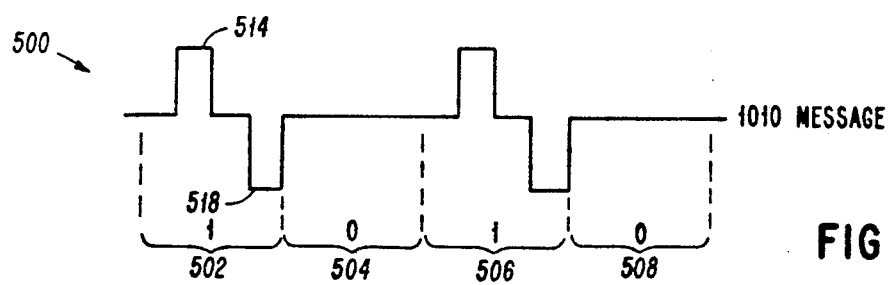
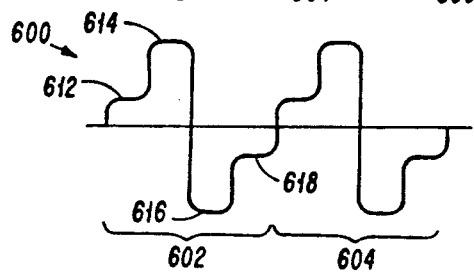
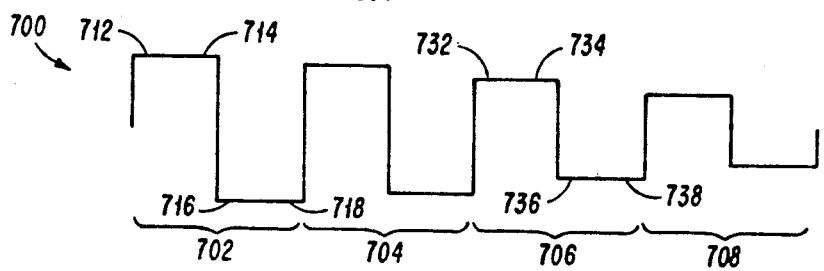
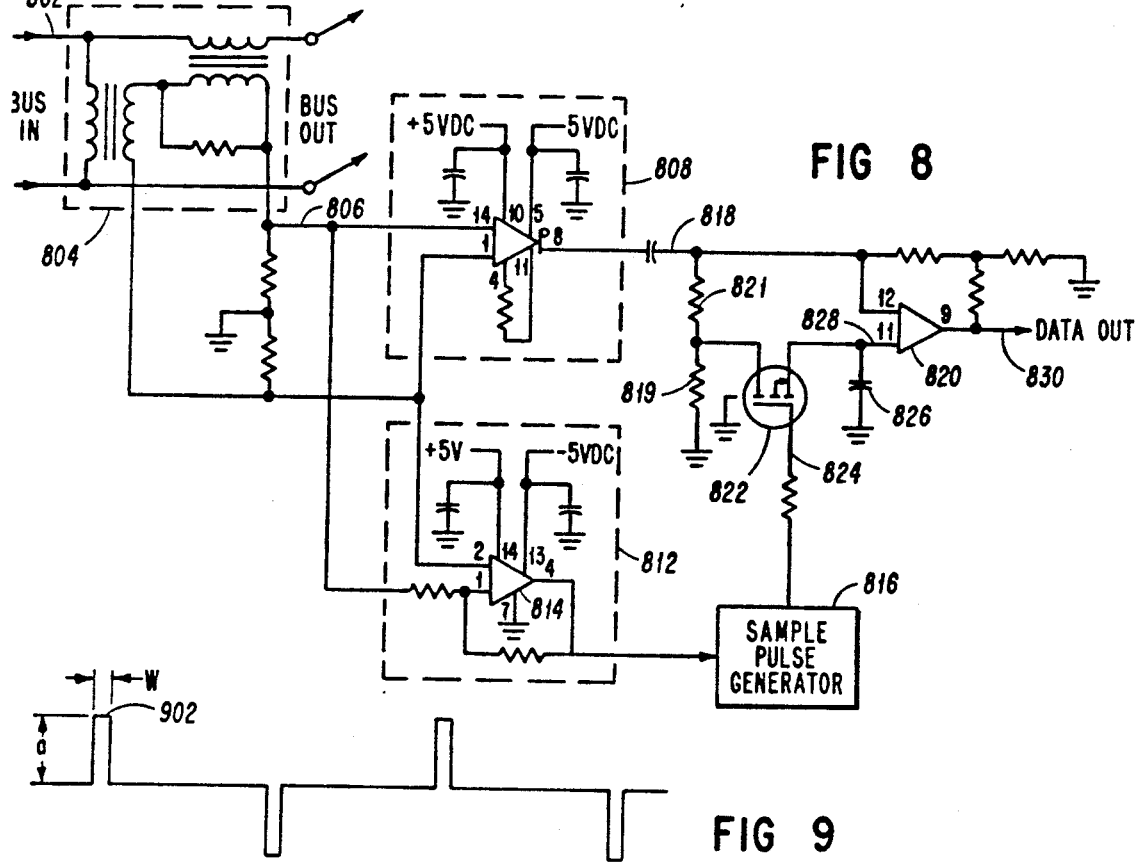

METHOD AND APPARATUS FOR DETECTING SIGNALS ON DIGITAL DATA SYSTEMS

CROSS-REFERENCE TO RELATED APPLICATIONS

This application is a Continuation-in-Part application of U.S. application entitled, "Digital Data Coding Technique", having a Ser. No. 07/258,923, filed on Oct. 17, 1988, now U.S. Pat. No. 4,952,070 issued 08/28/9 by Fred J. Studenberg and David L. Leedke, which application is incorporated herein by this reference.

FIELD OF THE INVENTION

This application relates to digital data systems, and more particularly, to such data systems having capability of augmenting the data message at remote locations without requiring a re-transmission of the complete message at each remote location; and even more particularly, concerns method and apparatus for detecting data signals which originate from several locations about the system.

BACKGROUND OF THE INVENTION

During the development of the digital data system of this application and the above referenced application, it became apparent that improvements in the signal detection method may be helpful.

The digital data system of the present invention has the capability of allowing numerous remote terminals to augment a message at various remote locations around the system. As the number of remote terminals, upon the system, fluctuates, the average signal strength correspondingly fluctuates. These fluctuations in signal amplitude complicate the signal detection. Furthermore, the inherent attenuation of signals along the transmission line creates disparity in signal amplitude at any given point depending on the relative location of the remote terminal transmitting that message and the location of the distant receiver.

For example, the original data and clock signal which is transmitted by the transmitter 202 (FIG. 2) is received back at receiver 204 (FIG. 2) but at an attenuated level, due to the inherent signal loss along the transmission line. However, an identical logic level message which is added to the system at a remote terminal nearer the receiver will not travel as long on the transmission line, as an original message or logic level, and thereby will not experience as much signal amplitude attenuation. As a result, the signal at the receiver will have variations in amplitude. As stated earlier, these signal variations complicate the detection of the desired signals.

Consequently, there exists a need for advancement in signal detection schemes for digital data systems, which does not use absolute signal amplitude for the detection of signals.

SUMMARY OF THE INVENTION

It is an object of the present invention to provide a method for detecting signals on a digital data system.

It is a feature of the present invention to determine the presence of a signal by a relative comparison of a sample signal, derived from the original clock signal, with the signal to be detected.

It is an advantage of the present invention to detect signals despite the presence of amplitude fluctuations.

It is another object of the present invention to allow for increased remote terminals on the digital data system.

It is another feature of the present invention to use a passive coupler with the transmission line, which only slightly diminishes the signal strength on the transmission line.

It is another advantage of the present invention to allow for signal detection of a relatively weak signal.

It is yet another object of the present invention to use remote terminals, throughout the system, having the same transmission power regardless of location on the transmission line.

It is yet another feature of the present invention to compare the received signal with a sample pulse generated from the received clock signal.

It is yet another advantage of the present invention to not require variable power transmitters at various locations on the transmission in order to compensate for signal attenuation along the transmission line.

The present invention was designed to satisfy aforementioned needs, accomplish the already articulated objects, include the above described features and achieve the earlier express advantages. The present invention is an "absolute amplitude detection-less" system, in the sense that no detection of absolute amplitude is performed. Instead, the present invention uses a relative comparison of the received signal with a sample signal generated from received original clock information.

Accordingly, the present invention comprises a method and apparatus for detecting a signal by comparing the signal with a sample signal relating to the received clock signal.

BRIEF DESCRIPTION OF THE DRAWINGS

The invention may be more fully understood by reading the following description of a preferred embodiment of the invention in conjunction with the appended drawings wherein:

FIG. 5 is a schematic representation of a signal waveform of the encoding technique of the present invention, which would typically be transmitted by an intermediate remote terminal in order to "extend" the signal of FIG. 3 into the signal of FIG. 4.

FIG. 6 is a schematic representation of a signal waveform which represents the received signal which originated from a source near the receiver and one distant from the receiver.

FIG. 7 is a schematic representation of a signal waveform, representing a received signal, where numerous remote terminals are augmenting the message.

FIG. 8 is a schematic representation of a preferred embodiment of an electronic circuit of the present invention.

FIG. 9 is a representation of a sample pulse of the present invention.

DETAILED DESCRIPTION

Figure 1:
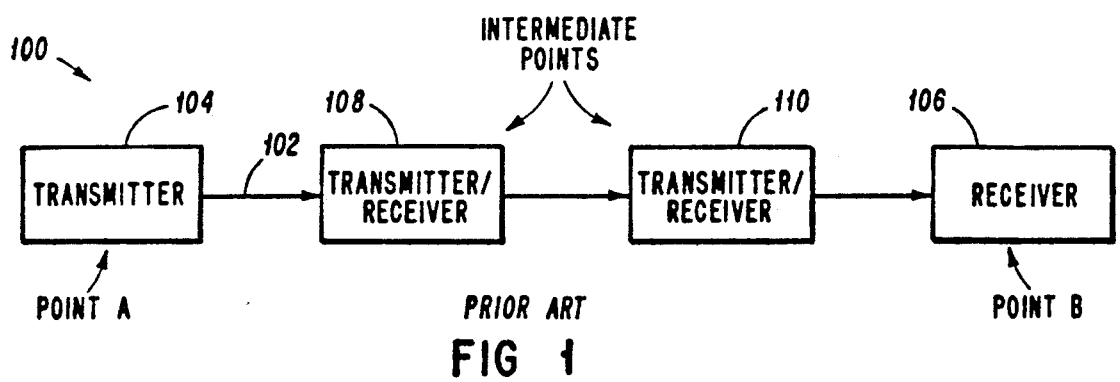
FIG. 1 is schematic representation of a typical digital data transmission system, of the prior art, which includes a group of transmitters and receivers, connected in series by several transmission

Now referring to FIG. 1, there is shown a digital data transmission system, of the prior art, generally designated 100. System 100 is shown having a transmission line 102 extending from transmitter/receiver 104, at point A, to transmitter/receiver 106θ, at point B, with several intermediate transmitters and receivers, interposed therebetween for augmenting the message from A to B. Typically, an AMI code would be used to encode the message period. Such a code is well known in the art and is discussed with other known codes in Section 8.2.1 on pages 177-180 and Sections 9.1 through 9.4 on pages 213 through 229 of PCM and Digital Transmission Systems, by Frank F. E. Owen, published by McGraw-Hill, Inc. of New York, N.Y. in 1982, these pages are hereby incorporated herein by this reference.

Figure 2:
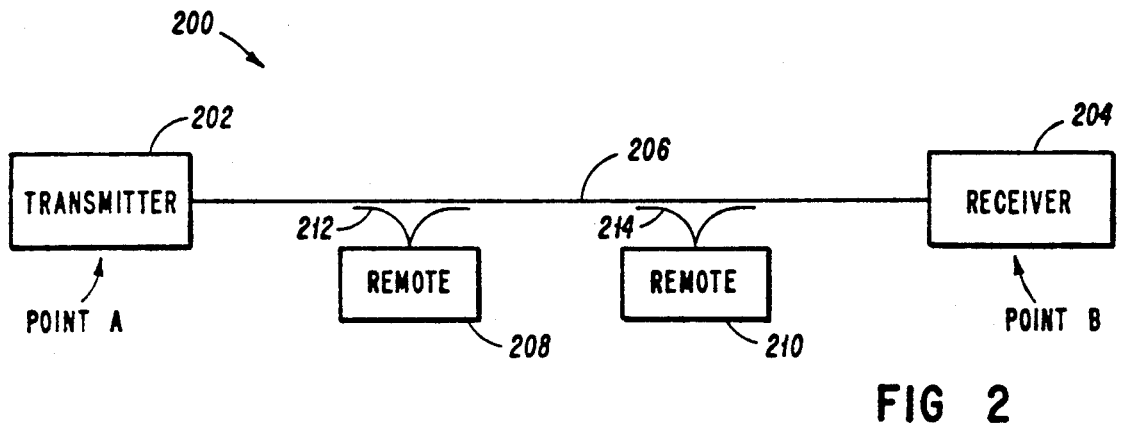
FIG. 2 is a schematic representation of a preferred embodiment of the present invention, which shows an audio management unit connected to a distant receiver unit, by a single transmission line, with several remote terminals disposed at intermediate points therebetween.

Now referring to FIG. 2, there is shown a digital data transmission system of the present invention, generally designated 200 with a transmitter 202, at point A, which is connected to receiver 204, at point B, by transmission line 206. Remote terminals 208 and 210 are coupled to transmission line 206 by directional couplers 212 and 214, respectively. Transmitter 202 transmits a signal having a clock signal and message information embedded therein.

Figure 3:
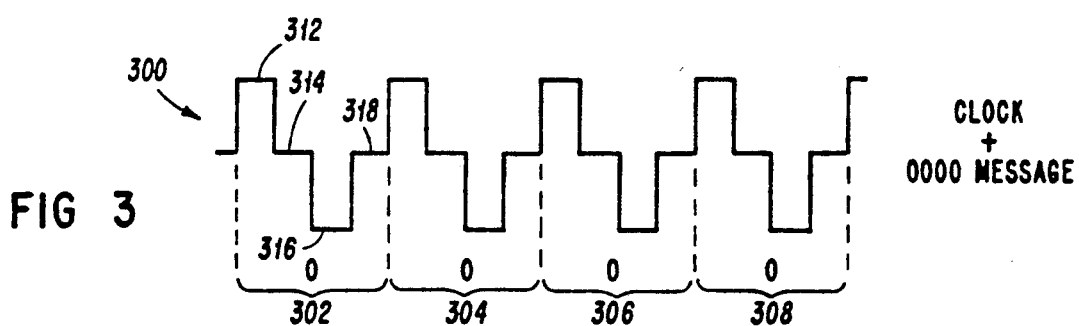
FIG. 3 is a schematic representation of a signal waveform of the encoding technique of the present invention which includes the clock information and a 0000 message.

Now referring to FIG. 3, there is shown a digital clock and data signal, of the present invention, generally designated 300, which is shown divided into a first time interval 302, a second time interval 304, a third time interval 306 and a fourth time interval 308. During first time interval 302, the pulse waveform is represented by a initial positive rectangular pulse 312 followed by a first flat extension region 314, which is followed by a negative rectangular pulse 316 which is followed by a second flat extension region 318. Second time interval 304, third time interval 306 and fourth time interval 308 are identical in all respects to first time interval 302. The waveform 300 includes both clock information and digital data information. The digital data information of waveform 300 is completely zeros. Now referring to FIG. 2, transmitter 202 transmits a clock and zero data message waveform such as waveform 300 (FIG. 3). Remote terminals 208 and 210 are able to detect the waveform 300 as it progresses along transmission line 206 to receiver 204. Remote terminals 208 and 210 are capable of changing the digital data message information from zeros to ones and thereby add additional data which will be received by the receiver 204.

Figure 4:
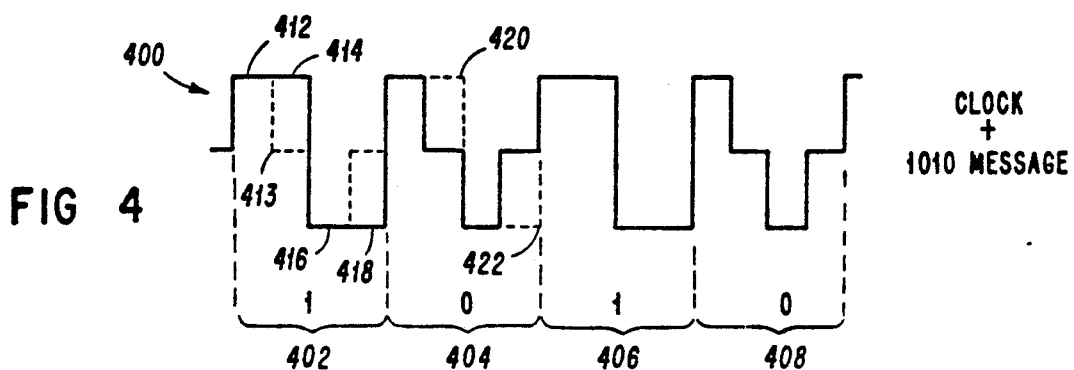
FIG. 4 is a schematic representation of a signal waveform of the encoding technique of the present invention, in which the message has been augmented to be a 1010 message.

Now referring to FIG. 4, there is shown a digital clock and data message waveform of the present invention, generally designated 400. Waveform 400 is divided into a first augmented time interval 402, a second augmented time interval 404, a third augmented time interval 406 and a fourth augmented time interval 408. During the first augmented time interval 402, which corresponds to the first time interval 302 (of FIG. 3) the waveform 400 has been changed from a zero data message to a one data message by pulse 414. In more detail, the first augmented time interval 402 consists of an "extended" positive rectangular pulse which includes a first half pulse 412 followed by a second half pulse 414. The dotted line 413 represents the waveform during the first time interval 302 (of FIG. 3). The waveform 400 during the first augmented time interval 402 then exhibits a negative rectangular pulse having a first half pulse 416 and a second half rise 418. First half 416 corresponds to the negative rectangular pulse 316 (FIG. 3). The dotted line 413 corresponds to the waveform 300 during time interval 302 (FIG. 3). It can be clearly seen that the waveform 400 during first augmented time interval 402, which represents a digital one signal, is identical to the waveform 300 during time interval 302 (FIG. 3) except that the initial rectangular positive pulse 312 and the negative rectangular pulse 316 (FIG. 3) have been "extended" in to and over the extension region and now represent a digital one. Second augmented time interval 404, which is a digital zero message, corresponds to the second time interval 304 (FIG. 3). This time interval includes both the clock information and the zero data message information without alternation. The third augmented time interval 406, which corresponds to a digital one message, is identical to the signal during the first augmented time interval 402 and represents an "extension" of the waveform 300 during the third time interval 306 (FIG. 3). Similarly, the fourth augmented time interval 408 of the waveform 300 during the fourth time interval 308 without change.

Now referring to FIG. 5, there is shown a digital data message waveform of the present invention, generally designated 500. Waveform 500 is representative of a waveform transmitted by a remote terminal 208, or 210 (FIG. 2). The waveform 500 is chosen to represent the remote transmission that would result in transforming or "extending" waveform 300 (FIG. 3) into waveform 400 (FIG. 4).

Waveform 500 is divided into a first remote time interval 502, a second remote time interval 504, a third remote time interval 506 and a fourth remote time interval 508. First remote time interval 502 is shown having a positive rectangular pulse 514 and a negative rectangular pulse 518. Positive rectangular pulse 514, when combined with positive rectangular pulse 312 (FIG. 3) forms a waveform similar to the positive rectangular waveform produced pulses 412 and 414 (FIG. 4). Similarly, negative rectangular pulse 518, when combined with negative rectangular pulse 316 (FIG. 3), forms the negative rectangular pulse 416 and 418 (FIG. 4). Consequently, the zero of first time interval 302 (FIG. 3) is changed or "extended" in to the first augmented time interval 402 (FIG. 4) by being impressed upon by the waveform of remote time interval 502.

The waveform shown during remote time interval 504 is a flat signal and as such, when combined with the signal during the first time interval 304 (FIG. 3), results in the unchanged waveform of the second augmented time interval 404 (FIG. 4). Similarly, the data message waveform of the third remote time interval 506 is similar to the waveform of the first remote time interval 502 and the fourth time remote interval 508 is similar to the second remote time interval 504.

In operation, the transmitter 202 (FIG. 2) transmits a digital signal similar to the waveform 300 (FIG. 3), which includes both clock information and zero digital message information along transmission line 206 to receiver 204. Transmitter 202 can also transmit "one" digital information to receivers in remotes 208 and 210.

Transmitter 202 typically transmits "zero" digital information during intervals which are pre-assigned for augmentation of the message by remotes 208 and 210. Remote terminal 208, which is coupled to transmission line 206 by directional coupler 212, is able to augment the signal transmitted by transmitter 202 by impressing additional information thereon. Typically, the signal which is being transmitted down transmission line 206 is remotely sensed through the directional coupler 212 by remote terminal 208. The signal then can be altered to one that more resembles waveform 400 of FIG. 4, by extending the zero signal into the extension region, and thereby changing the zero to a one.

However, if for some reason remote terminal 208 or directional coupler 212 fail to operate, the signal which corresponds to waveform 300 (FIG. 3), will continue to receiver 204 without occlusion by the inoperable remote terminal 208. Similarly, the remote terminal 210, which is coupled to the transmission line 206 by directional coupler 214, may augment the waveform as it passes along the transmission 206 and likewise, in the event of a remote terminal 210 failure the signal along transmission 206 is not occluded from reaching transmitter/receiver 204.

It is understood by persons having skill in the art, that the transmission of all the signals herein described, may be on transmission lines which are either electrical conductors or optical fibers. The transmitters, receivers and directional couplers which are utilized in either approach are known in the art and are a matter of the designers preference. However, it is suggested that when electrical conductors are used as transmission lines, that it may be preferable to use signals having both positive and negative pulses.

In operation, it is required that the clock information, as originally transmitted from the transmitter 202 (FIG. 2) be recovered from the signal received by receiver 204 (FIG. 2). However, this signal may not appear as shown in FIG. 4, it may be actually received as shown in FIG. 6 and 7.

Now referring to FIG. 6, there is shown a possible received waveform, generally designated 600, which is divided into a first received time interval 602 and a second received time interval 604. First received time interval 602 having a first original transmitted positive pulse 612, a first augmented positive pulse 614, a first augmented negative pulse 616 and a first original transmitted negative pulse 618. The amplitudes of pulse 612 and 618 are lesser in magnitude than pulses 614 and 616. This represents a received signal wherein the augmented pulses 614 and 616 were added at a location along the transmission line or bus much nearer to the receiver than at the original transmitter.

Now referring to FIG. 7, there is shown a possible received waveform, generally designated 700, which includes first time interval 702, second interval 704, third interval 706, and fourth interval 708. First interval 702 having a first original fluctuated positive pulse 712 and a first augmented positive pulse 714, a first augmented negative pulse 716 and a first original negative pulse 718. Third interval 706 includes third original positive pulse 732, third augmented positive pulse 734, third augmented negative pulse 736 and third original negative pulse 738. Third pulses 732, 734, 736 and 738 have an amplitude with a lesser magnitude than do pulses 712, 714, 716 and 718, respectively. The difference in magnitude is a result of fluctuations in the bus relating from variations in the number of remote terminals augmenting messages.

Now referring to FIG. 8, there is shown a schematic diagram of a preferred embodiment of the present invention, generally designated 800, which includes a system bus 802 for the digital data system of the present invention. Associated with system bus 802 is a passive couple 804 for providing a receiver bus 806, which carries a signal thereon which corresponds to the signal on system bus 802. Preferably passive couple 804 is designed to allow the signal on system bus 802 to pass with a small degree of attenuation due to the coupling. Receiver bus 806 is coupled with signal amplifier 808 which includes an amplifier therein, which is preferably a 733 type video amplifier. Also coupled with receiver bus 806 is the clock recovery device 812 which includes comparator 814, which is preferably a 521 type comparator. Clock recovery device 812, or the like, preferably recovers the originally transmitted clock signal from the received signal on receiver bus 806. Coupled with recovery device 812 is a sample pulse generator 816, which generates a sample pulse as shown in FIG. 9 and as described below.

An amplified received signal is output on line 818, from signal amplifier 808, and is input into comparator 820 and also divided off through receiver 821 to MOSFET 822, whose gate 824 is coupled with sample pulse generator 816. Current is allowed to flow through MOSFET 822 only when the sample pulse is applied to gate 824, during which time capacitor 826 is charged and thereby maintains a relatively constant voltage, except for leakage, on line 828 into comparator 820, during the times when no sample pulse is applied to gate 824. Data is output from comparator 820 on line 830 and can be readily used by additional logic (not shown) to generate the final message information.

Now referring to FIG. 9 and FIG. 8, there is shown a representation of a preferred sample pulse from a sample pulse generator 816. The width H of sample pulse 902 is variable depending on the RC time constant of resistor 821 and capacitor 826. Width H is preferably adequate width to allow the capacitor 826 to charge to peak during the time MOSFET 822 allows current to pass through, in response to sample pulse 902 on gate 824. Amplitude A of pulse 902 is chosen to be at some intermediate amplitude between the average detected maximum amplitude for the leading edge of the clock pulse and zero amplitude. Preferably the level is chosen at one-half the average detected maximum amplitude.

It is thought that the method and apparatus of the present invention and many of its attendant advantages will be understood from the foregoing description, and it will be apparent that various changes may be made in the form, construction and arrangement of the parts and the steps thereof without departing from the spirit and scope of the invention, or sacrificing all their material advantages, the forms described herein being merely preferred embodiments thereof.

I claim:

1. An apparatus for detecting digital data signals on a digital data system bus, the apparatus comprising:
   a passive coupler, coupled with the system bus for coupling off a received signal from the system bus;
   a receiver bus coupled with said passive coupler for carrying said received signal;
   a signal amplifier coupled with said receiver bus for amplifying said received signal and generating an amplified signal;

means for recovering clock information, embedded in said received signal and originating from the earlier transmission, said means for recovering also generating a recovered clock signal;

means for generating a sample pulse in response to said recovered clock signal;

means for comparing said amplified signal with said sample pulse.

2. An apparatus of claim 2 wherein said means for recovering clock information includes a comparator.

3. An apparatus of claim 3 wherein said means for comparing comprises a transistor and a comparator.

4. An apparatus of claim 4 wherein said transistor comprises a MOSFET.

5. An apparatus for detecting digital data signals on a digital data system bus, the apparatus comprising:

a passive coupler coupled with the system bus for coupling off a received signal from the system bus;

a receiver bus coupled with said passive coupler for carrying said received signal;

a signal amplifier coupled with said receiver bus for amplifying said received signal and generating an amplified signal;

comparator means for recovering clock information embedded in said received signal and originating from an earlier transmission, said comparator means for recovering clock information also generating a recovered clock signal;

means for generating a sample pulse in response to said recovered clock signal;

a MOSFET coupled with said means for generating a sample signal and with said signal amplifier;

a comparator for comparing said amplified signal with said sample pulse and coupled with said signal amplifier and said MOSFET.

* * * * *